United States Patent
Sujan (10) Patent No.: US 10,865,877 B2
(45) Date of Patent: *Dec. 15, 2020

(54) POWERTRAIN OPTIMIZATION (71) Applicant: Cummins, Inc., Columbus, IN (US)

(72) Inventor: Vivek A. Sujan, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/039,654

(22) Filed: Jul. 19, 2018

(65) Prior Publication Data
US 2018/0320782 A1 Nov. 8, 2018

Related U.S. Application Data (63) Continuation of application No. 14/712,003, filed on May 14, 2015, now Pat. No. 10,030,764.

(60) Provisional application No. 61/993,896, filed on May 15, 2014.

(51) Int. Cl.
*F16H 61/02* (2006.01)
*F16H 61/00* (2006.01)
*F16H 59/74* (2006.01)

(52) U.S. Cl.
CPC ..... *F16H 61/0213* (2013.01); *F16H 61/0204* (2013.01); *F16H 59/74* (2013.01); *F16H 2061/0012* (2013.01); *F16H 2061/0015* (2013.01); *F16H 2061/0018* (2013.01); *F16H 2061/0227* (2013.01); *F16H 2061/0232* (2013.01)

(58) Field of Classification Search
CPC ............ F16H 61/0213; F16H 61/0204; F16H 2061/0012; F16H 2061/0015; F16H 2061/0018; F16H 2061/0227; F16H 2061/0232; F16H 59/74; F16H 61/02
See application file for complete search history.

(56) References Cited

U.S. PATENT DOCUMENTS

| | | |
|---|---|---|
| 5,070,832 A | 12/1991 | Hapka et al. |
| 5,832,400 A | 11/1998 | Takahashi et al. |
| 6,561,145 B1 | 5/2003 | Stockhausen et al. |
| 7,650,224 B2 | 1/2010 | Andrea et al. |
| 8,099,220 B2 | 1/2012 | Kim et al. |
| 8,145,376 B2 | 3/2012 | Sherony |
| 8,187,149 B2 | 5/2012 | Koenig |
| 8,255,152 B2 | 8/2012 | Barth et al. |
| 8,442,732 B1 | 5/2013 | Steeby |
| 8,543,302 B2 | 9/2013 | Yoshikawa et al. |
| 8,585,550 B2 | 11/2013 | Watanabe et al. |
| 8,676,455 B2 | 3/2014 | Busdiecker et al. |
| 10,030,764 B2 * | 7/2018 | Sujan ................. F16H 61/0213 |
| 2011/0106388 A1 | 5/2011 | Boeckenhoff et al. |
| 2012/0116647 A1 | 5/2012 | Pochner et al. |

(Continued)

*Primary Examiner* — Huan Le
(74) *Attorney, Agent, or Firm* — Foley & Lardner LLP (57) ABSTRACT

A system includes a powertrain system including a transmission, and a controller coupled to the powertrain system. The controller is structured to: receive operation data regarding operation of the powertrain system; determine the powertrain system is operating in a non-nominal state responsive to the operation data; adjust a shift schedule for the transmission based on the determined non-nominal state; and control the transmission based on the adjusted shift schedule.

18 Claims, 7 Drawing Sheets

(56) References Cited

U.S. PATENT DOCUMENTS

| | | | |
|---|---|---|---|
| 2012/0209482 A1* | 8/2012 | Busdiecker | ......... F16H 61/0213 |
| | | | 701/54 |
| 2012/0221217 A1 | 8/2012 | Sujan et al. | |
| 2013/0038438 A1 | 2/2013 | Olsen et al. | |
| 2013/0184949 A1 | 7/2013 | Saito et al. | |
| 2014/0019022 A1 | 1/2014 | Kresse et al. | |

* cited by examiner

POWERTRAIN OPTIMIZATION

CROSS-REFERENCE TO RELATED APPLICATIONS

This application is a continuation of U.S. patent application Ser. No. 14/712,003 filed May 14, 2015 and entitled "POWERTRAIN OPTIMIZATION," which claims the benefit of U.S. Provisional Patent Application No. 61/993,896 filed May 15, 2014 and entitled "POWERTRAIN OPTIMIZATION," both of which are incorporated herein by reference in their entireties.

TECHNICAL FIELD

The present disclosure relates to powertrain systems for a vehicle. More particularly, the present disclosure relates to optimized control of powertrain systems during non-nominal operation of a vehicle.

BACKGROUND

In a vehicle, the powertrain or powertrain system refers to the components that provide the power to propel the vehicle. These components include the engine, transmission, drive/propeller shaft, differentials, and final drive. In operation and for an internal combustion engine, the engine combusts a fuel to generate mechanical power in the form of a rotating a crankshaft. The transmission receives the rotating crankshaft and manipulates the engine speed (i.e., the rotation of the crankshaft) to control a rotation speed of the drive/propeller shaft, which is also coupled to the transmission. The rotating drive shaft is received by a differential, which transmits the rotational power to a final drive (e.g., wheels) to effect a movement of the vehicle. In an automobile, the differential enables the wheels, on a shared axle, to rotate at different speeds (e.g., during a turn, the outer wheel spins faster relative to the inner wheel to allow the vehicle to maintain its speed and line of travel).

Because the engine speed does not always equate to a desired final drive speed (and, consequently, vehicle speed), the transmission manipulates the engine speed to affect the drive shaft speed for a desired vehicle speed. To achieve a different drive shaft speed relative to the engine speed, some transmission systems utilize a plurality of gears that either increase or decrease the drive shaft rotational speed relative to the engine speed (e.g., 2:1, which indicates that the engine is rotating twice as fast as the output speed). Gear selection can be done by an operator of the vehicle or automatically without operator input and can be based on engine speed, vehicle speed, throttle position, and load on the engine. For example, during highway driving, the transmission may use a high gear that provides a relatively higher transmission output speed (i.e., speed of propeller/driver shaft) than a low gear to maintain/achieve the relatively greater vehicle speed needed for highway driving. As such, the transmission allows the vehicle to achieve desired vehicle speeds and powers largely independent of the engine speed. However, transmission operation and control strategies therefor are independent from engine operation and control strategies for the engine, such that inefficiencies exist from operation of the engine-transmission system.

SUMMARY

One embodiment relates to a method including receiving vehicle operation data; receiving an input; determining that a vehicle is in a non-nominal state based on at least one of the input and the vehicle operation data, the non-nominal state indicating that the vehicle is operating outside a normal operating condition; and providing a command to a transmission of the vehicle based on the determined non-nominal state of the vehicle, wherein the command is structured to affect a transmission output speed setting of the transmission.

Another embodiment relates to a system for a vehicle. The system includes a powertrain system including an engine, a transmission, a drive shaft, and a final drive; and a controller communicably coupled to the powertrain system. The controller is structured to: receive vehicle operation data during operation of a vehicle; receive route data for a route of the vehicle, wherein the route data is received in advance of the vehicle traveling the route; determine a cylinder deactivation event has occurred based on the vehicle operation data; determine an adjustment to a shift schedule for the transmission based on at least one of the cylinder deactivation event and the route data; and provide a command to implement the adjustment with the transmission.

Still another embodiment relates to a system for a vehicle. The system includes a powertrain system including an engine, a transmission, a drive shaft, and a final drive; and a controller communicably coupled to the powertrain system. The controller is structured to: provide a command to deactivate a cylinder of the engine during operation of a vehicle; receive vehicle operation data based on the command; determine an adjustment to a control of a component of the powertrain system based on the vehicle operation data; and determine an adjustment to a component of the powertrain system based on the vehicle operation data.

Yet another embodiment relates to an apparatus. The apparatus includes a vehicle operation module structured to receive operation data regarding operation of a vehicle; an operating state module structured to determine that the vehicle is operating in a non-nominal state responsive to the operation data; and a transmission module structured adjust a shift schedule of a transmission of the vehicle responsive to the determined non-nominal operating state for the vehicle.

Another embodiment relates to a vehicle having a powertrain system, the powertrain system including an engine coupled to a transmission. The vehicle also includes a controller communicably coupled to the powertrain system, the controller structured to: receive operation data regarding operation of the powertrain system; determine the engine is operating in a non-nominal state responsive to the operation data; and adjust a shift schedule for the transmission based on the determined non-nominal state of operation for the engine.

Still another embodiment relates to a method. The method includes interpreting, by a controller, at least one of vehicle operation data regarding operation of a vehicle, route data regarding an upcoming terrain condition for a route of the vehicle, and dynamic data from at least one of another vehicle and an external network regarding an upcoming operating condition for the vehicle; determining, by the controller, that the vehicle is at least one of in a non-nominal operating state and about to be in the non-nominal operating state; and adjusting, by the controller, a shift schedule for a transmission of the vehicle responsive to the determination that the vehicle is in or about to be in the non-nominal operating state.

These and other features, together with the organization and manner of operation thereof, will become apparent from

DETAILED DESCRIPTION OF VARIOUS EMBODIMENTS

Referring to the Figures generally, the various embodiments disclosed herein relate to systems and methods of improving the functionality and structure of a powertrain system for a vehicle operating, about to operate in, or likely to operate in (within a certain amount of time or distance) a non-nominal state. Generally speaking, when a vehicle is in a non-nominal state, the vehicle is no longer operating normally. For example, a non-nominal state may include when the vehicle is traveling through the mountains at high altitudes where the oxygen content is relatively lower, such that the engine does not operate as designed. Another example includes when one or more cylinders are deactivated (e.g., a cylinder cut-out operating mode). According to the present disclosure, a controller may be operatively coupled to an internal combustion engine and a transmission in the vehicle. Due to this integration, in these non-nominal states, the controller can receive data from both the engine and the transmission in addition to the vehicle itself in real time or substantially real time. The controller may utilize this data to improve functionality of a component of the powertrain system. For example, during a diagnostic session (a non-nominal state), the controller manipulates the transmission setting to examine, check, or diagnose one or more engine sensors (e.g., a vehicle speed sensor). In this regard, the controller can manipulate the speed of the drive shaft via the transmission to a speed that it would typically not experience in combination with the corresponding engine speed in order to perform one or more diagnostic procedures. Such speed manipulation may increase the efficacy of the diagnostic procedures. However, such functionality of the controller is not limited to diagnostic, prognostic, or troubleshooting sessions. Rather and according to the present disclosure, the controller may control one or more components in the powertrain system during other non-nominal operating states in order to improve operation of the powertrain system in general.

In certain embodiments, the controller is structured to change a shift schedule for the vehicle during this non-nominal state operation. The controller may adjust the shift schedule based on any one of a variety of desired optimization functions (e.g., fuel economy, performance, an emissions characteristic, etc.). For example, Applicants have determined that during a cylinder cutout mode, the brake specific fuel consumption (BSFC) map of the engine changes. Accordingly, the original transmission shift schedule fails to account for this feature. Therefore, the controller of the present disclosure may be structured to adjust the shift schedule of the transmission during the cylinder cutout mode to account for the altered BSFC map of the engine. In certain embodiments and at the operator's preference/discretion, the shift schedule may be altered to optimize or improve at least one of fuel economy, performance, emissions, and the like for the engine. These and other features of the present disclosure are explained more fully herein.

As used herein (with examples provided below), the term "non-nominal state" (or off-nominal state) refers to a deviation of operation of the vehicle (or powertrain system, more particularly) from a normal (nominal) operating mode/condition. The deviation can occur in one or more components of the vehicle (e.g., the engine) and can be based on the environment in which the vehicle is operated (e.g., very cold temperatures, extreme heat, high altitudes, etc.). The deviation amount that indicates a non-nominal state can be preset and is adjustable (e.g., altitudes above 5,500 feet above sea level indicate a non-nominal state for vehicle). As another example, a non-nominal state can include a cylinder cutout mode for the engine (e.g., when a six-cylinder engine utilizes three-cylinders and not six to operate the vehicle, etc.).

As also used herein, the term "shift schedule" refers to when and to what gear (if the transmission is geared) shift events happens. For example, at approximately 2,500 revolutions-per-minute (RPM) and rising, the transmission will shift to a next higher gear (e.g., $2^{nd}$ gear to $3^{rd}$ gear). Typically, shift schedules are predetermined by transmission manufacturers, such that they are not integrated with the engine or the rest of the vehicle. As also used herein, the term "shift event" refers to the transmission undergoing a shift (i.e., a change in transmission setting) to manipulate the speed of the drive/propeller shaft relative to the engine speed. As transmissions vary from geared to continuous configurations (e.g., continuous variable transmission), the term "shift event" is not limited to just an increase or decrease in gears (e.g., $3^{rd}$ to $2^{nd}$ gear). Rather, the term "shift event" encompasses any type of engine speed manipulation (setting) performed by the transmission. For example, a shift event in a continuous variable transmission indicates either an increase/decrease in the ratio of input-to-output pulley. As such, the term "shift event" (and "shift schedule") applies to any type of transmission.

Figure 1:
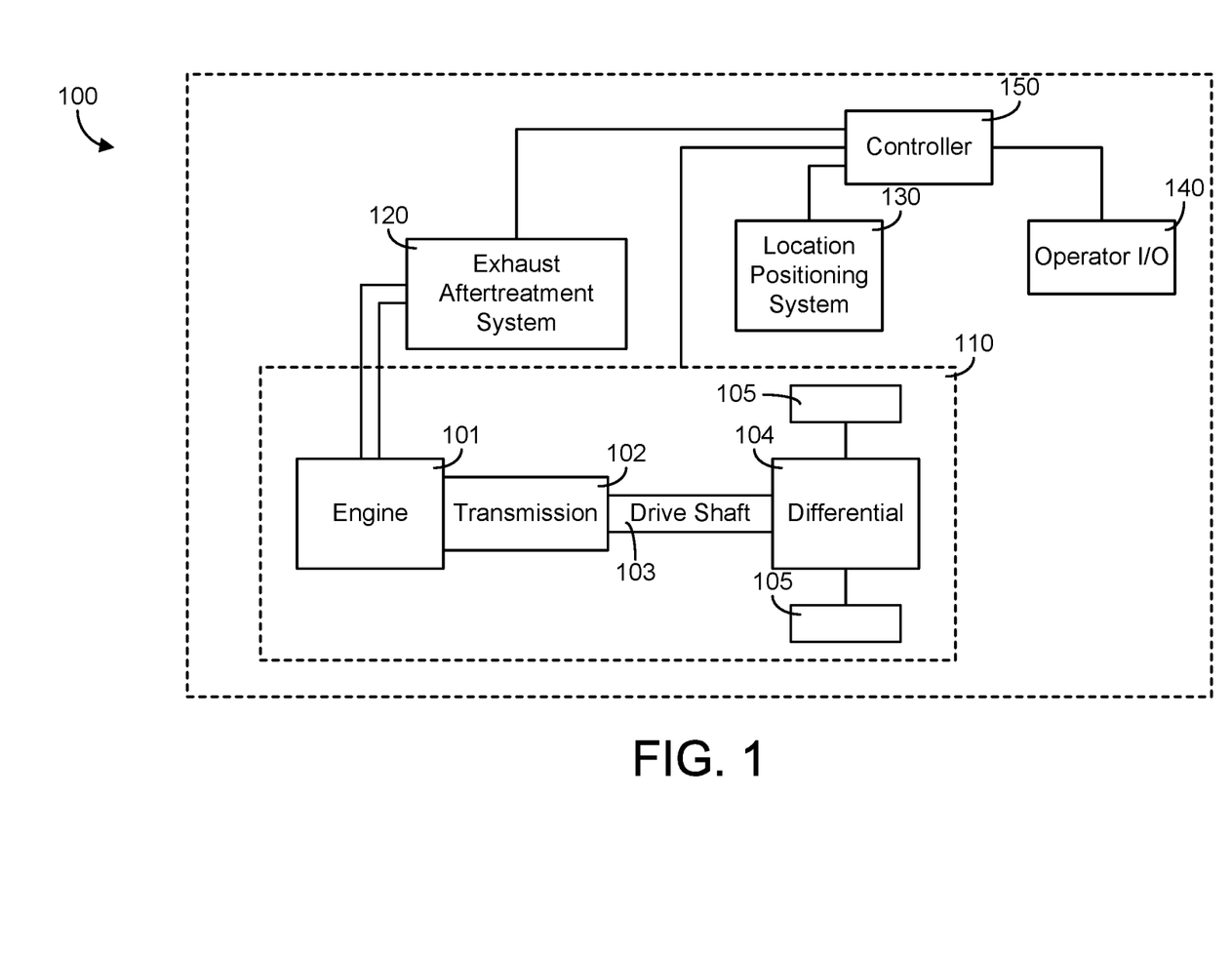
FIG. 1 is a schematic diagram of a powertrain system coupled to a controller in a vehicle, according to an example embodiment.

Referring generally to FIG. 1, a schematic diagram of a controller communicably coupled to a powertrain system as well as other components in a vehicle is shown according to an example embodiment. The vehicle 100 may be a hybrid vehicle, a full electric vehicle, internal combustion engine powered vehicle like shown, and/or any other type of vehicle that utilizes a transmission. As such, the vehicle 100 may be configured as an on-road or an off-road vehicle including, but not limited to, line-haul trucks, mid-range trucks (e.g., pick-up truck), tanks, airplanes, and any other type of vehicle that utilizes a transmission. The vehicle 100 is shown to generally include a powertrain system 110, an exhaust aftertreatment system 120, a location positioning system 130, an operator input/output (I/O) device 140, and a controller 150.

The powertrain system 110 facilitates power transfer from the engine 101 to power the vehicle 100. The powertrain system 110 includes an engine 101 operably coupled to a transmission 102, a drive shaft 103, and a differential 104, where the differential 104 transfers power output from the engine 101 to the final drive (shown as wheels 105) to propel the vehicle 100. As a brief overview, the engine 101 receives a chemical energy input (e.g., a fuel such as gasoline or diesel) and combusts the fuel to generate mechanical energy, in the form of a rotating crankshaft. The transmission 102 receives the rotating crankshaft and manipulates the speed of the crankshaft (i.e., the engine RPM) to effect a desired drive shaft 103 speed. The rotating drive shaft 103 is received by a differential 104, which provides the rotation energy of the drive shaft 103 to the final drive 105. The final drive 105 then propels or moves the vehicle 100.

The engine 101 may be structured as any internal combustion engine (e.g., compression-ignition or spark-ignition), such that it can be powered by any fuel type (e.g., diesel, ethanol, gasoline, etc.). Similarly, the transmission 102 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 101 and the transmission 102, the drive shaft 103, differential 104, and final drive 105 may be structured in any configuration dependent on the application (e.g., the final drive 105 is structured as wheels in an automotive application and a propeller in an airplane application). Further, the drive shaft 103 may be structured as a one-piece, two-piece, and a slip-in-tube driveshaft based on the application.

As also shown, the vehicle 100 includes an exhaust aftertreatment system 120 in fluid communication with the engine 101. The exhaust aftertreatment system 120 receives the exhaust from the combustion process in the engine 101 and reduces the emissions from the engine 101 to less environmentally harmful emissions (e.g., reduce the NOx amount, reduce the emitted particulate matter amount, etc.). As the example in FIG. 1 is a diesel-powered vehicle 100, the exhaust aftertreatment system 120 includes any component used to reduce diesel exhaust emissions, such as a selective catalytic reduction catalyst, a diesel oxidation catalyst, a diesel particulate filter, a diesel exhaust fluid doser with a supply of diesel exhaust fluid, and a plurality of sensors for monitoring the system 120 (e.g., a NOx sensor).

Figure 2:
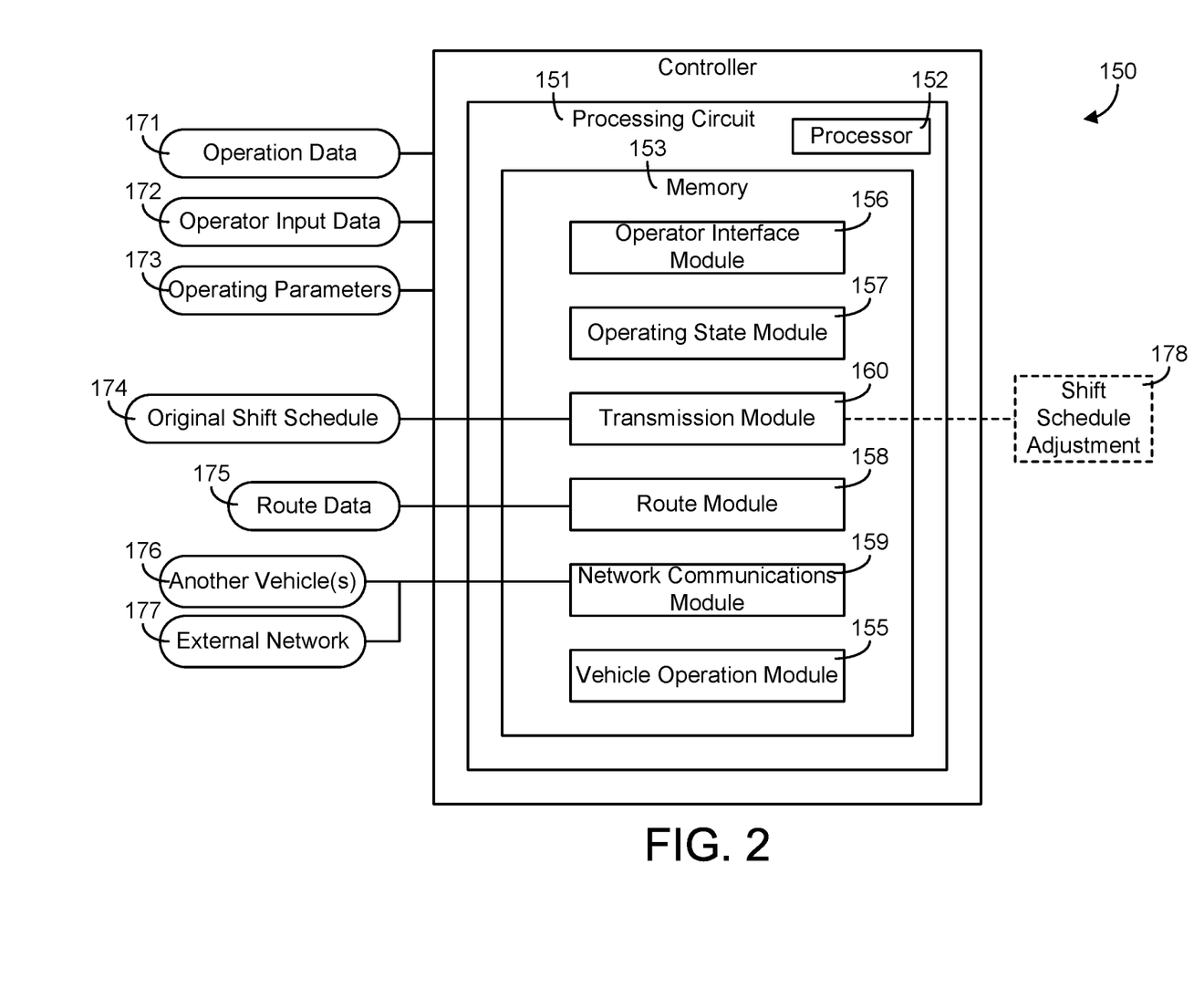
FIG. 2 is a schematic diagram of the controller used with the system of FIG. 1, according to an example embodiment.

As explained more fully in regard to FIG. 2, the location positioning system 130 is structured to receive route data (e.g., route data 165) for a route of the vehicle 100. The location positioning system 130 can therefore be structured as any location system, such as a global positioning system that is communicably coupled to one or more satellites, and the like. In operation, the operator input/output device 140 enables an operator to specify a route of the vehicle. In some embodiments, the controller 150 divides the route into one or more route segments. The division may be based on a distance (e.g., one-hundred feet, one length of a line-haul truck, etc.), terrain (e.g., an uphill portion, a downhill portion, and a flat portion), or any another route dividing characteristic. As such, the route data may correspond with each particular route segment. For example, road curvature and altitude levels may be specific to each route segment. Further, after specification of the route, the controller 150 can receive the route data in advance of the vehicle 100 traveling the route (prior to each route segment traversal). The route data may include any type of data indicative of a characteristic of a route for the vehicle. Accordingly, the route data may include, but is not limited to, an indication of a curvature, a grade, a speed limit, the number of lanes, signage, and the like for one or more segments of the route. As explained in regard to method 300, the controller 150 utilizes the route data and in some embodiments, in connection with the vehicle operating data, to adjust a shift schedule for the transmission during or in advance of a likely non-nominal operating condition of the vehicle.

The operator input/output device 140 enables an operator of the vehicle to communicate with the vehicle 100 and the controller 150. For example, the operator input/output device 140 may include, but is not limited, an interactive display (e.g., a touchscreen, etc.), an accelerator pedal, a clutch pedal, a shifter for the transmission, a cruise control input setting, etc. Via the input/output device 140, the operator can designate preferred characteristics of one or more vehicle parameters. Additionally, the input/output device 140 can enable placement of the vehicle 100 into a non-nominal state, receive an indication that the vehicle is currently in or about to be in a non-nominal state, and/or define what constitutes a non-nominal state. The controller 150 can also provide commands/instructions/information to the operator via the input/output device 140 (e.g., shift to this transmission setting now).

As shown, the controller 150 is communicably coupled to the powertrain system 110, the exhaust aftertreatment system 120, the location positioning system 130, and the operator input/output device 140. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data (e.g., instructions, commands, signals, values, etc.) from one or more of the components shown in FIG. 1. The vehicle operating data may be received via one or more sensors (e.g., a speed sensor attached to the engine) attached to the components in FIG. 1.

As the components of FIG. 1 are shown to be embodied in a vehicle 100, the controller 150 may be structured as an engine control module (ECM). The ECM may include a transmission control unit and any other control unit included in a vehicle (e.g., exhaust aftertreatment control unit, powertrain control module, etc.). The function and structure of the controller 150 are shown described in greater detail in FIG. 2.

Accordingly, referring now to FIG. 2, the function and structure of the controller 150 are shown according to one example embodiment. The controller 150 is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the controller 150 and provide computer code or instructions to the controller 150 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes modules a vehicle operation module 155, an operator interface module 156, an operating state module 157, a route module 158, a network communications module 159, and a transmission module 160. The modules are configured to selectively adjust a transmission shift schedule for the vehicle 100 responsive to a determined non-nominal operation state for the vehicle 100 and, in some embodiments, adjust the transmission shift schedule to maximize or affect one or more desired operating parameters for the vehicle 100 (e.g., fuel economy, power performance, emissions, etc.). While various modules with particular functionality are shown in FIG. 2, it should be understood that the controller 150 and memory 154 may include any number of modules for completing the functions described herein. For example, the activities of multiple modules may be combined as a single module, as additional modules with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

In one embodiment, the operator interface module 156 may be communicably coupled to the operator I/O device 140 to receive inputs from (e.g., voice commands, touch commands, etc.) and provide information to operator, passenger, or other user of the vehicle 100. In another embodiment, the operator interface module 156 may include the operator I/O device 140. While the module 156 is named using the term "operator" (similar to "operator" I/O device 140), this notation is not meant to be limiting as these components may be utilized by users other than the vehicle operator. In operation, the operator interface module 156 is structured to receive operator input data 172. The operating input data 172 may provide an indication that the vehicle 100 is operating in or about to be operating in a non-nominal state, an input to put the vehicle 100 into a non-nominal operating state, and/or an input to define what constitutes a non-nominal state for the vehicle (e.g., when exhaust emissions level is above "X", the vehicle is in a non-nominal state). For example, an operator may provide the controller 150 with an input that the vehicle is about to enter a diagnostic session. In which case, the controller 150 may remove any operating constraints otherwise present with the vehicle (e.g., an engine speed limit or an automatic derate constraint at certain conditions) such that various diagnostic procedures may be performed. In this regard, the vehicle is put into a non-nominal operating state. In another example, the operator may indicate a desire to deactivate one or more cylinders of the engine. In which case, the controller 150 provides a command to deactivate the one or more cylinders and the vehicle is in a non-nominal state. In connection to the non-nominal state determination, a user or operator of the vehicle with the controller 150 may specify environment conditions or operating conditions that indicate a non-nominal state of operation (e.g., altitudes above 5,500 feet constitute a non-nominal state, engine speed to drive shaft speed ratios that are not typical, engine temperatures, fuel pressure thresholds, exhaust emissions characteristics, road grades, etc.). Thus, the delineation of non-nominal states and when a non-nominal state is determined may be highly configurable and vary from application-to-application.

The vehicle operation module 155 is structured to receive operation data 171. The operation data 171 provides an indication of operating conditions experienced by the vehicle 100. The operation data 171, also referred to as vehicle operation data, may include but is not limited to, the vehicle speed, the current transmission gear/setting, the load on the vehicle/engine, the throttle position, a set cruise control speed, data relating to the exhaust aftertreatment system 120, output power, engine speed, fluid consumption rate (e.g., fuel consumption rate, diesel exhaust fluid consumption rate, etc.), any received engine/vehicle faults (e.g., a fault code indicating a low amount of diesel exhaust fluid), engine operating characteristics (e.g., whether all the cylinders are activated or which cylinders are deactivated, etc.), etc. Data relating to the exhaust aftertreatment system 120 includes, but is not limited to, NOx emissions, particulate matter emissions, and conversion efficiency of one or more catalysts in the system 120 (e.g., the selective catalytic reduction catalyst). In this regard and in certain embodiments, the vehicle operation module 155 may include one or more sensors operable to acquire the aforementioned data, such as temperature sensors, flow sensors, pressure sensors, speed sensors, fluid level sensors, oxygen sensors, mass air flow sensors, and the like.

The operating state module 157 is structured to determine whether the vehicle 100 is operating in a non-nominal state. In certain embodiments, the operating state module 157 may utilize one or more formulas, algorithms, look-up tables, models, and the like to determine the existence of a non-nominal state. In other embodiments, the operating state module 157 may include the aftertreament system controller, the engine controller, the transmission controller, and any other controller that can provide an indication of non-nominal state operation for one or more components in the vehicle 100. In further embodiments, the operating state module 157 may include one or more of the aforementioned controllers with one or more formulas, equations, processes, algorithms, and the like to determine the existence of a non-nominal operating state. All such variations are intended to fall within the spirit and scope of the present disclosure.

In one embodiment, the operating state module 157 is structured to determine whether a non-nominal operating state exists based on the operation data 171. As mentioned above, the vehicle operation data 171 may indicate a variety of non-nominal or potentially non-nominal states. For example, an ambient temperature level below a predefined temperature may indicate a cold environment that is indicative of a non-nominal state. This may be based on a predefined cold temperature threshold, which is indicated by a temperature sensor or engine operating conditions such as an ambient pressure and a compression ratio associated with cold temperature operating conditions for powertrain 110. In another example, the vehicle operation data 171 includes one or more faults (e.g., a fault code). Based on the fault (e.g., what the fault refers to, such as the engine), the controller 150 determines that the vehicle is in a non-nominal state because the fault condition indicates a non-normal operating behavior of the vehicle, such as a derate condition. A derate condition refers to a condition or circumstance that limits power output. For example, a low amount of diesel exhaust fluid may cause a derate condition. Although more power from the engine is requested, the engine restricts the power output because the increase in power comes from additional fueling, which causes additional NOx (and other) emissions that cannot be reduced to a predefined acceptable level with the amount of diesel exhaust fluid remaining. Further, there may be temporary derate conditions, such as an oxygen fuel content below a certain threshold. There also may be relatively more permanent derate conditions, such as a diesel exhaust fluid level dropping below a critical threshold and the like. In another example, the DPF may not be regenerating due to a delta pressure differential across the DPF that is above a critical threshold, which causes a relatively more permanent derate condition. Thus, a derate condition may be caused from a variety of operating conditions and may result in temporary and/or permanent derate conditions. A non-nominal condition may also refer to relatively high altitude levels for the vehicle. This may be indicated by pressure data (e.g., ambient pressure above a threshold). This may also be provided by route data 175 and the dynamic data. This additional data may verify the pressure data due to sensor inaccuracies, humidity affects, and the like to confirm that a high altitude condition exists. A non-nominal state may also refer to one or more various emissions characteristics, such as a NOx emissions amount above a predefined threshold, a NOx conversion efficiency below a predefined threshold, a particulate matter emissions amount above a threshold, a diesel exhaust fluid consumption rate above a predefined threshold, a temperature of one or more components in the aftertreatment system above or below a threshold, etc. The non-nominal state may also refer to grade conditions for the vehicle 100 above or below predefined thresholds. Determination of the grade conditions may be via route data, operation data, and dynamic data (described below). In still further embodiments, the road curvature may exceed a predefined threshold, which indicates a non-nominal operating state for the vehicle 100. Accordingly, the delineation of non-nominal states is highly configurable and may change application-to-application.

In another example embodiment, via at least one of the input data 172 and the operation data 171, the operating state module 157 may determine that the vehicle 100 is operating in a non-nominal state, such as a cylinder cutout mode. Cylinder cutout mode refers to engine operation where combustion events occur in less than all of the cylinders of the engine (e.g., providing fuel and air to four cylinders while not providing fuel to the other two cylinders, such that only four of the six cylinders can experience a combustible event). Cylinder cutout mode is used to conserve fuel for the vehicle and corresponds with a non-nominal state of the vehicle. For example, typical engine operation corresponds with two crankshaft revolutions for firing (combustion) events to occur or be able to occur in all six cylinders of the engine. The data 171 may indicate that combustion events have been occurring in only three cylinders for the past six revolutions of the crankshaft (i.e., past three full cycles, where "full cycle" refers to a combustion event occurring or scheduled to occur in each cylinder of the engine). As such, the operating state module 157 may determine that the vehicle is operating in a cylinder a cutout mode. In another example, the operator may indicate to (via device 140) that the engine is in a cylinder cutout mode.

Figure 3:
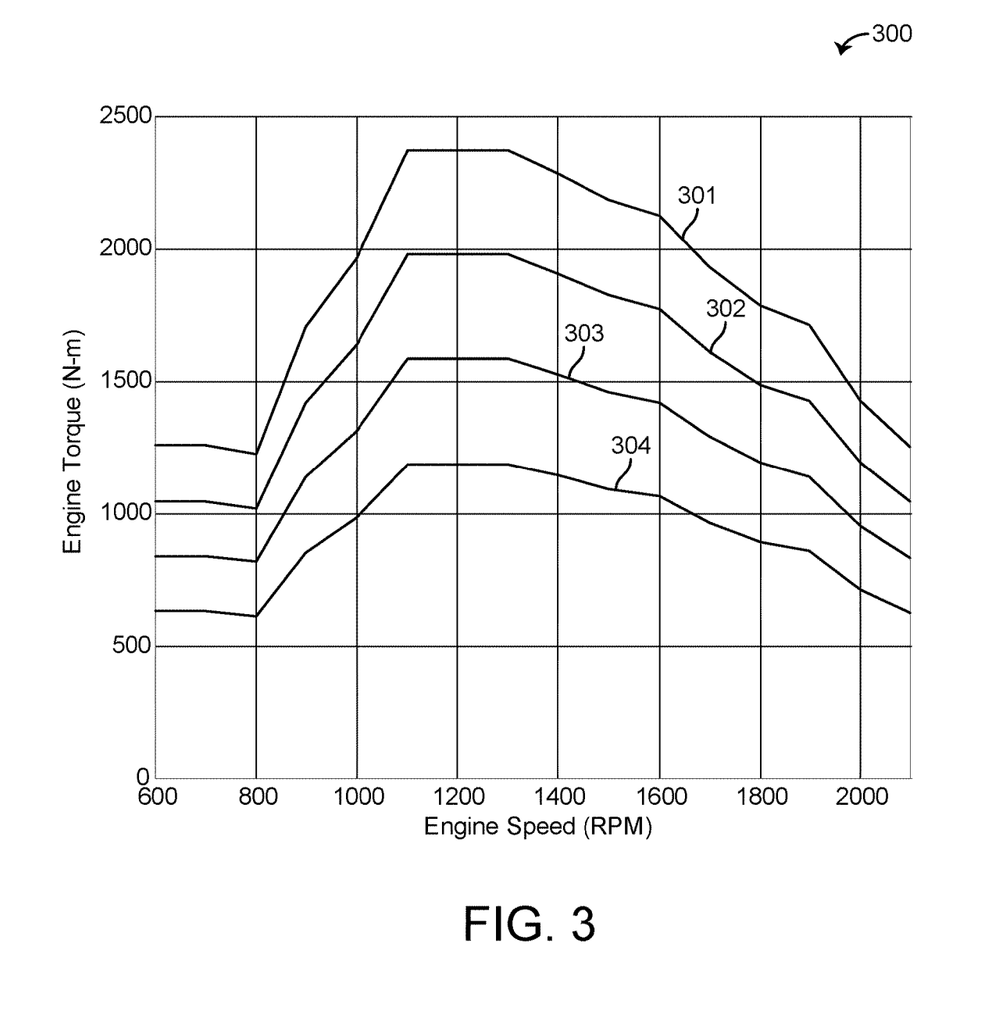
FIG. 3 is an engine torque versus speed graph for an engine during a cylinder cutout operating mode, according to an example embodiment.

In regard to cylinder cutout mode, Applicants have determined that a cylinder cutout mode corresponds with a substantial effect on the engine torque versus speed and BSFC map. Referring now to FIG. 3, an engine torque versus engine speed graph 300 is shown according to one embodiment. In this regard, those of skill in the art can readily appreciate that graph 300 may change from engine-to-engine, but the principles depicted in graph 300 will remain substantially constant in each engine application. Graph 300 depicts a six-cylinder engine, where curve 301 represents a max torque-speed curve for the engine; curve 302 represents a max torque-speed curve for the engine with one-cylinder deactivated; curve 303 represents a max torque-speed curve for the engine with two-cylinders deactivated; and, curve 304 represents a max torque-speed curve for the engine with three-cylinders deactivated. As shown, the max torque-speed curve decreases as the number of cylinders deactivated increases. Accordingly, in one embodiment, the operating state module 157 receives operation data 171 indicating a torque and speed of the engine 101 (e.g., from a torque sensor and a speed sensor) and determines whether the engine 101 is operating or likely operating in a one-cylinder, two-cylinder, or three-cylinder cutout mode. The module 157 may use a look-up table or other type of matching function to determine whether and how many cylinders are currently deactivated. Of course, this type of matching process may vary from engine-to-engine. As described herein below, based on this determination, the transmission module 160 may alter the shift schedule 178 for the transmission 102.

The route module 158 is structured to receive route data 175. Accordingly, in certain embodiments, the route module 158 may include the location position system 130 while in other embodiments, the route data 175 is provided by the location position system 130 (or other component) to the module 158. Based on the route data 175, the operating state module 157 may determine if a non-nominal operation state is upcoming or likely upcoming for the vehicle 100 for the designated route or route segment. For example, the route data 175 may indicate an upcoming hill for the vehicle 100, which will cause the vehicle to exert power above a power threshold for nominal operation such that the operating state module 157 determines a non-nominal operation state is forthcoming. The route data 175 includes, but is not limited to, latitude data, longitude data, altitude data, posted speed limits, grades, signage for the routes, and curvature data for the route. In some embodiments, the route module 158 divides the route into one or more route segments. The route segments correspond with substantially continuous portions of route data 175 (e.g., the altitude for this portion of the route stays substantially the same). Accordingly, the route data 175 may correspond with each one of the segments of the route. Latitude and longitude data provides an indication of the location of the vehicle. Altitude data provides an indication of the level of elevation of the route to, for example, indicate downhill and uphill portions of the route. Curvature data provides an indication of the curves in the route. In one embodiment and as mentioned above, the route data 175 is obtained by the location positioning system 130 and provided to the route module 158.

While the route module 158 may provide an indication that a potential non-nominal state for the vehicle 100 is upcoming, the route data 175 that is substantially static in nature (e.g., the road curvature, road grade, and the like are non-changing variables). Accordingly, the network communications module 159 is structured to receive data to dynamically determine if a non-nominal state is upcoming or likely upcoming for the vehicle 100. The network communications module 159 is structured to communicate with at least one of another vehicle 176 (e.g., via short-range to medium-range wireless communication, etc.) and an external network 177 (e.g., a central server, database, a fleet manager, a traffic center, global positioning systems, etc.) to establish an intelligent transportation system (ITS). The network communications module 159 may send and/or receive data regarding the vehicle 100, other vehicles, traffic conditions, road conditions, and the like. The network communications module 159 may provide an operator with real-time travel and traffic information via the operator I/O device 140, such as transit routes and schedules, navigation directions, and information about delays due to congestion, accidents, weather conditions, road repair work, etc. In some embodiments, the network communications module 159 is able to inform an operator of the vehicle 100 in real-time of his/her precise location, inform him/her of current traffic or road conditions on a current and/or surrounding roadways, and empower him/her with optimal route selection and navigation instructions. Further, the network communications module 159 may receive information/data regarding one or more other vehicles. The communication between the vehicles may be vehicle-to-vehicle or vehicle-to-server-to-vehicle (i.e., vehicle-to-"x" type communication). The vehicle-to-vehicle communication may be performed via any suitable short to medium range wireless communications protocol (e.g., Wi-Fi, infrared, radio, RFID, near-field communications (NFC), Bluetooth, etc.). The vehicle-to-server-to-vehicle (generally, vehicle-to-x) communication may be performed via any suitable long range wireless communications protocol. The data regarding the other vehicle(s) may include, but not limited to, traffic conditions they are currently experiencing or have experienced, road and environment conditions they are experiencing or currently experiencing, a current or past speed of the other vehicle at various locations, a current location of the other vehicle, a type of the other vehicle, and the like. The speed of the other vehicle may include an absolute speed of the other vehicle or a relative speed of the other vehicle in relation to the vehicle 100. The current location of the other vehicle may include an absolute location of the vehicle (e.g., GPS coordinates, etc.) or a relative distance of the other vehicle in relation to the vehicle 100.

Based on the data from another vehicle 176 and/or the external network 177, the operating state module 157 may determine dynamically that a non-nominal operating state for the vehicle 100 is upcoming or likely upcoming for a designated route of the vehicle 100 (or alter the non-nominal state determination provided by the route data). While the route module 158 may indicate a road curvature that the operating state module 157 determines will likely not result in a non-nominal operating state, the network communications module 159 may receive data from another vehicle 177 that an oil spill occurred on that part of the route. Due to the spill, the operator may change the operating characteristics of the vehicle 100 and cause it to operate in a non-nominal state in order to effectively traverse the spill. For example, while the vehicle may normally operate in fifth gear to achieve sixty miles-per-hour, the operator may desire more torque and use a lower gear to reduce a likelihood of a slip occurring over the oil spill.

Thus, a non-nominal state determination by the operating state module 157 may be based on solely an affirmation from a passenger or operator alone (e.g., via operator interface module 156), based solely on the operation data 171 received (via the operating state module 157 directly), based solely on route data 175 (e.g., via route module 158), based solely on data 176-177 (e.g., via network communications module 159), and/or some combination thereof. Advantageously therefore, the non-nominal state determination may be made as a function of the current position, a future position, and in response to dynamic conditions occurring between the current and future positions of the vehicle.

Based on a determined non-nominal operation state or a determined upcoming non-nominal operation state, the transmission module 160 is structured to determine an adjustment 178 to an original shift schedule 174 for the transmission 102 of the vehicle 100. In one embodiment, the transmission module 160 includes a transmission controller for the transmission 102. In another embodiment, the transmission module 160 is communicably coupled to the transmission controller. In the latter embodiment, the transmission module 160 may include communication circuitry configured to establish a communications network with the transmission controller. In still further embodiments, the transmission module 160 may include one or more actuators that can selectively adjust the transmission setting of the transmission 102 (e.g., a hydraulic actuator that moves a dog clutch in the transmission 102 to engage various gear settings, etc.). In one embodiment, the adjustment is predefined in one or more look-up tables (or, models, formulas, algorithms, and the like) based on the determined non-nominal state (e.g., cylinder cutout mode, derate condition, etc.). In this case, the adjustment may be non-nominal state dependent. For example, if a derate condition is determined, the transmission module 160 recalls the adjustment parameters associated with the derate condition. In other embodiments, the adjustment is based on the specific operating conditions associated with the non-nominal state (e.g., high engine speed to low drive shaft speed (beyond a predefined acceptable speed difference amount), etc.). In further embodiments, and as described herein below, the adjustment may be further customized based on a desired operating parameter(s) 173. All such variations are intended to fall within the scope of the present disclosure.

In regard to cylinder cutout mode and as mentioned above, because the transmission module 160 is integrated with the transmission and the other components of the powertrain system 110 (e.g., engine 101), the transmission module 160 can obtain data (i.e., vehicle operation data 171) that shows how the brake specific fuel consumption (BSFC)/brake thermal efficiency (BTE) map changes when the deactivation event occurs (i.e., cylinder cutout). BSFC can be described in regard to equation (1). The BTE can be described in regard to equation (2). It should be noted that other equations, formulas, or processes can be used in addition to or in place of equation (1) and (2) below.

$$BSFC = \frac{\text{fuel flow}}{\text{power}} = \frac{\text{fuel flow}}{\text{Engine}_{speed} * \text{Torque}} \quad (1)$$

$$BTE = \frac{1}{BSFC * HV_{fuel}} \quad (2)$$

$HV_{fuel}$ refers to the heating value of the fuel used with the vehicle. For example, diesel fuel has an HV value of approximately 0.0119 kW*hr/gram. As can be seen, the lower the BSFC value, the higher the efficiency. This is because more power is being extracted per unit of fuel used. As such, when a cylinder deactivation event occurs, relatively less fuel is utilized because fuel is not provided to the cylinder scheduled for deactivation. Due to this change, the BSFC/BTE values (map) can change drastically during a cylinder cutout mode as shown in FIG. 3.

Figure 4:
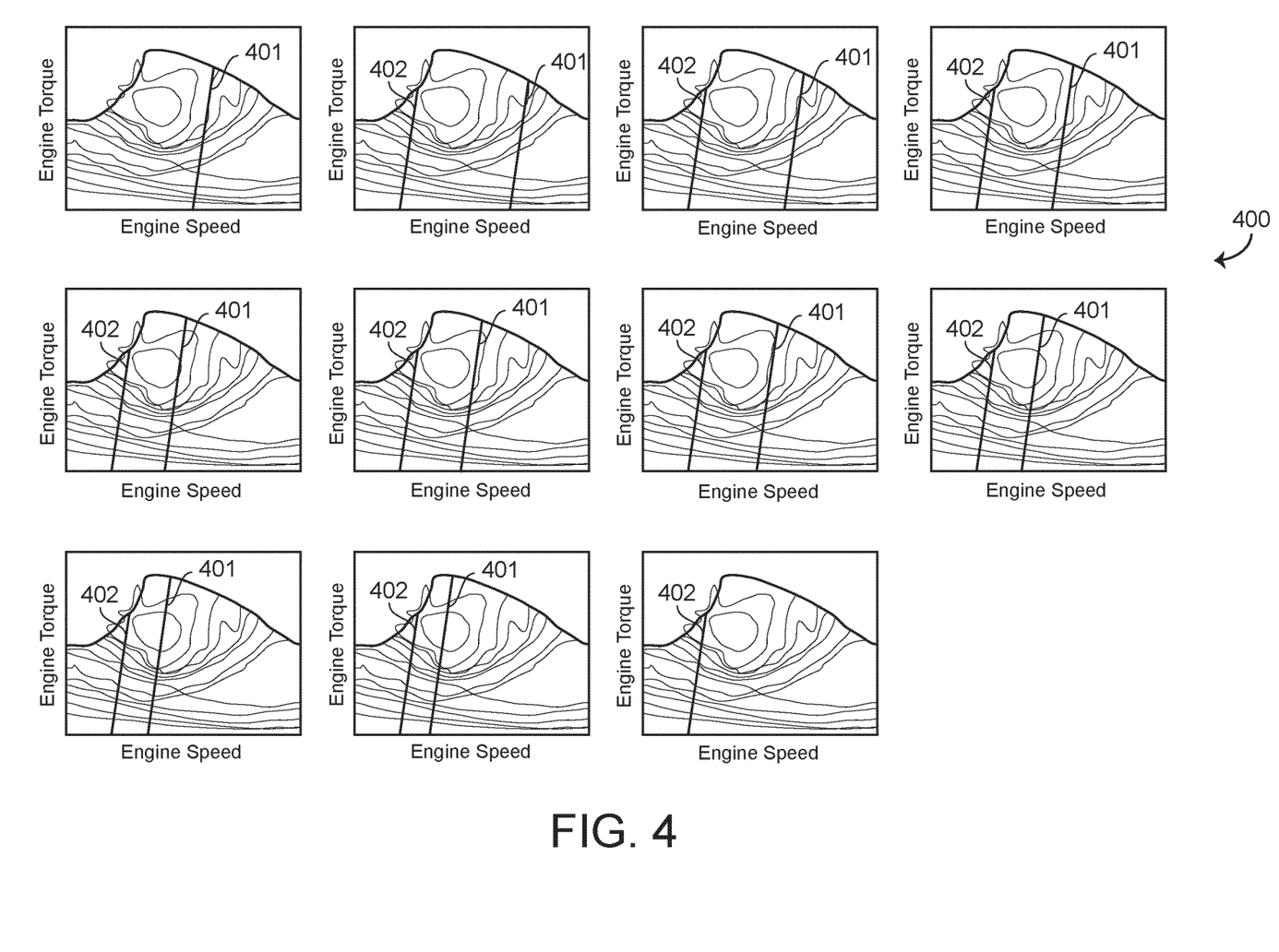
FIG. 4 is a graphical representation of a shift schedule for a transmission, according to an example embodiment.

FIG. 4 depicts an example shift schedule for an eleven-speed transmission. The slanted lines 401 represent the upshift operating conditions (e.g., from second to third gear) when the slanted lines 402 represent the downshift operating conditions (e.g., from second to first gear). Collectively, the graphs 400 represent an example shift schedule for a transmission.

In one embodiment, the transmission module 160 is structured to adjust the positioning of one or more shift points (e.g., lines 401 and 402) responsive to a determined non-nominal operating state or likely upcoming non-nominal operating state for the vehicle 100. Referring back to the specific situation of cylinder cutout mode, FIG. 3 depicts substantial engine torque versus speed variations during the cylinder cutout mode. Accordingly, the transmission module 160 may shift the upshift points (e.g., lines 401) left in regard to graph 400, such that upshifts occur at relatively lower engine speed. This may reduce the strain on the engine 101 while operating in cylinder cutout mode.

As mentioned above, the transmission module 160 may adjust the shift schedule in relation to a variety of different desired operating parameters 173. The operating parameters 173 may include, but are not limited to, maximizing fuel economy, maximizing performance, minimizing an emissions output characteristic, etc. Thus, still in regard to a cylinder cutout non-nominal state operating mode, staying in a higher gear tends to be at lower engine speeds, which tends to equate with relatively better fuel economy. Accordingly, if the desire is to maximize fuel economy, although the engine torque versus speed map has changed due to the cutout mode, the shift points can be further adjusted by moving upshift points left (e.g., to command shift events earlier, at lower speeds). If the desire is to maximize performance and a peak power for the engine is to the right of the upshift line, this would ordinarily be a performance inhibitor. However, the transmission module 160 may adjust the upshift line to the right to include the peak power operating point within the operating range for a particular gear or transmission setting, such that a shift event is not needed to achieve that peak power. This may increase performance, as desired, for the vehicle.

Accordingly, the transmission module 160 is structured to determine an adjustment to the shift schedule based on the change in BSFC/BTE map subject to one or more operating parameters of interest for the vehicle 100.

Figure 5:
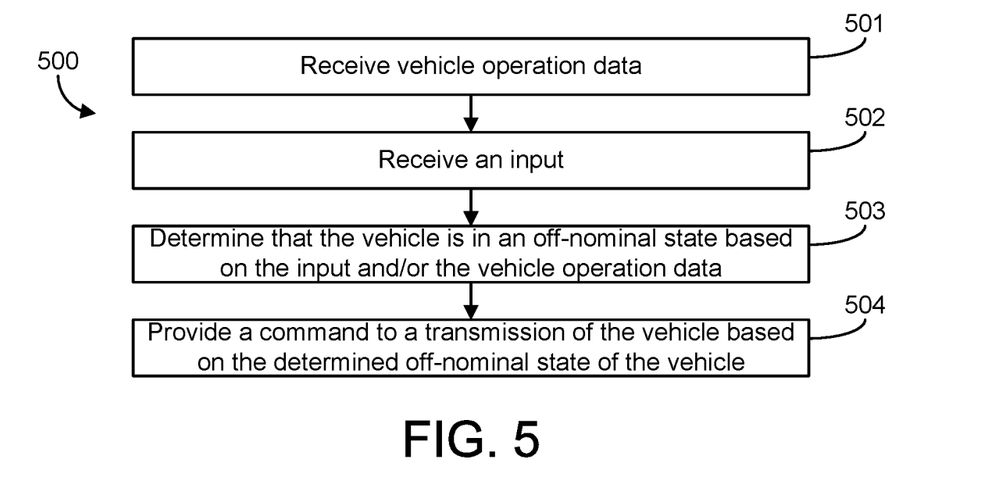
FIG. 5 is a flow diagram of a method of controlling a transmission during a determined non-nominal operating state for the vehicle, according to an example embodiment.
Figure 6:
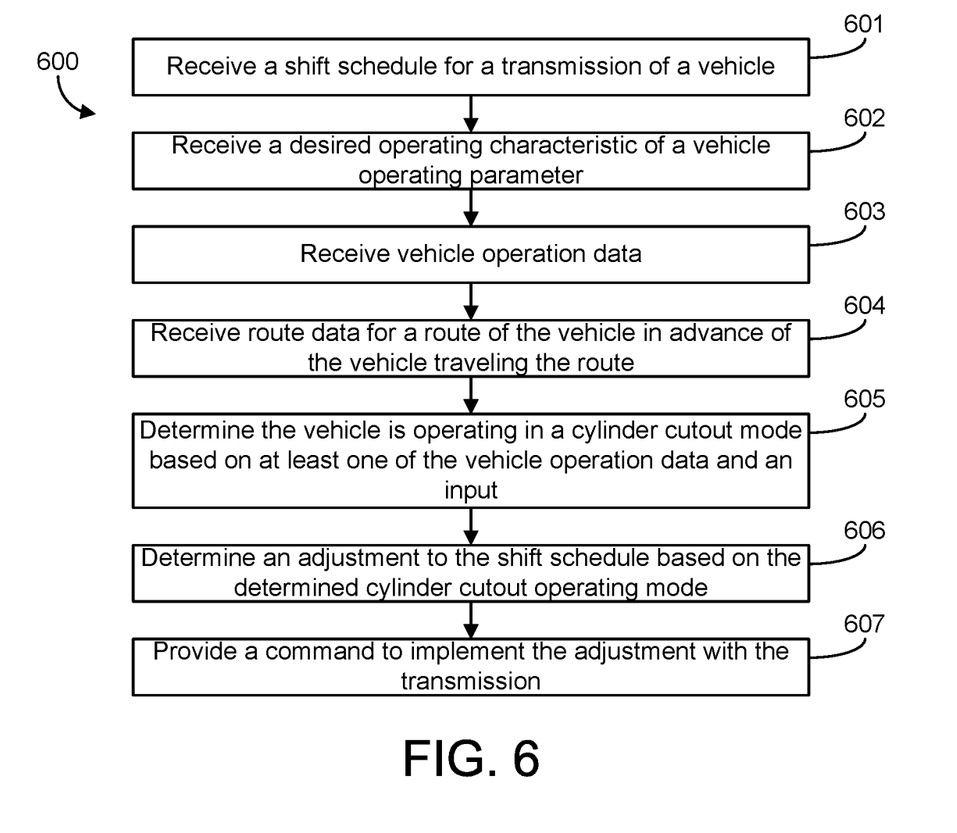
FIG. 6 is a flow diagram of a method of controlling a transmission of a vehicle during a cylinder cutout operating mode, according to an example embodiment.
Figure 7:
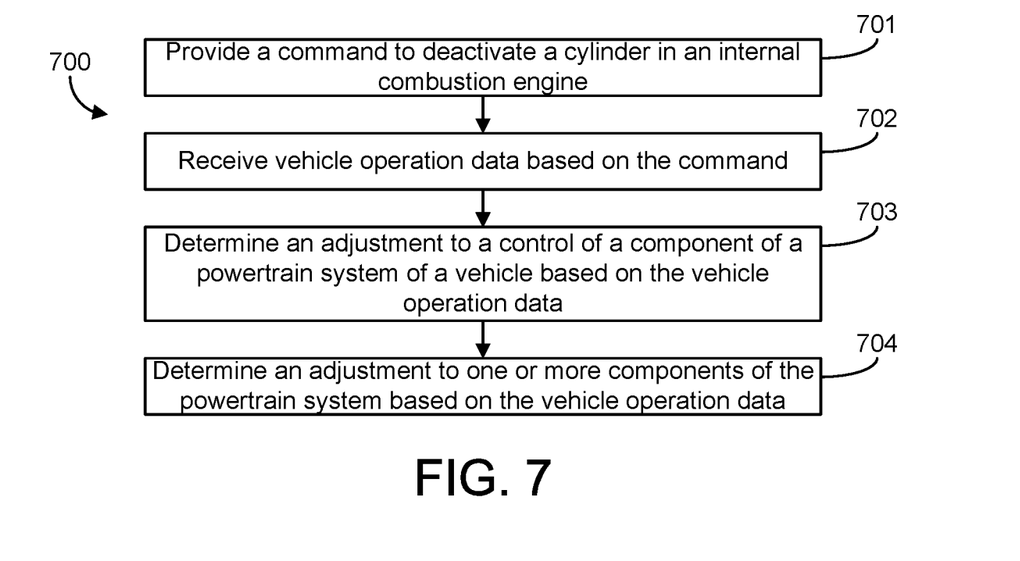
FIG. 7 is a flow diagram of a method of optimizing components and controls of components of a powertrain system for a cylinder cutout event, according to an example embodiment.

Example flowchart activities of the controller 150 are shown in FIGS. 5-7. Referring now to FIG. 5 in relation to FIG. 2, a method 500 of controlling a transmission during a non-nominal state of the vehicle is shown according to an example embodiment. Method 500 may be implemented with the controller 150 of FIG. 2. Accordingly, method 500 may be described in regard to FIGS. 1-2. At process 501, the controller 150 receives vehicle operation data for the vehicle (e.g., operation data 171). The vehicle operation data may provide an indication of a non-nominal operating state for the vehicle 100 (e.g., a power output above a power threshold for more than a predefined amount of time, a NOx emissions amount above a threshold for more than a predefined amount of time, etc.). At process 502, the controller 150 receives an input for the vehicle (e.g., input 172). The input includes any input from the operator, such as: depression of a clutch/accelerator/brake pedal; a desired operating characteristic of a vehicle operating parameter (e.g., operating parameter 173); a cruise control speed; a route of the vehicle; etc. Based on the vehicle operation data and/or the input, the controller 150 determines that the vehicle is in a non-nominal state (process 503). As mentioned above, a non-nominal state of the vehicle indicates that the vehicle is not operating in a typical/normal manner (e.g., utilizing less than all cylinders to generate power such as during a cylinder cutout mode, operating at a relatively high engine speed and low torque such as a troubleshooting or diagnostic session, etc.).

At process 504, the controller 150 provides a command to the transmission of the vehicle based on the determined non-nominal state of the vehicle. In one embodiment, the command is based on the type of non-nominal state determined (e.g., a derate condition, a diagnostic session, a prognostic session, etc.). For example, the vehicle may be in a diagnostic session (via the input, process 502). The command(s) provided to the transmission are structured to facilitate diagnosis one or more engine components (e.g., at a set fueling/throttling amount, the transmission is taken through all of its settings or gears). As such, the command(s) may affect a transmission output speed. In turn, the diagnostic session may be performed as a function of engine speed and various vehicle components are able to be diagnosed (e.g., sensors, fuel system characteristics, etc.).

In another example, the controller 150 may determine that the vehicle is in a derate condition (process 503). The controller 150 can adjust the transmission setting (e.g., a higher gear or setting), such that power of the vehicle is based on speed (not torque, which is limited by the derate condition). As such, operability of the vehicle may be increased relative to the derate operating condition. For example, where the operator of the vehicle would otherwise be likely prevented from passing another vehicle during the derate condition, the controller 150 adjusts the transmission setting to achieve a power output to pass or likely pass the other vehicle. Similarly, the controller 150 automatically adjusts the transmission setting in align with the derated engine, such that an operator does not need to search for the appropriate gear/setting, which also increases drivability/operability of the vehicle.

In other embodiments, the determined non-nominal state may be based on route data 165 and/or dynamic-type data via vehicle-to-vehicle communication and/or vehicle-to-"x" communication, as described herein above. In this regard, command at process 504 may proactively adjust a shift event of the original shift schedule for the transmission to gain additional benefits for the vehicle comprising enhanced control over the operating parameters of the vehicle.

Referring now to FIG. 6, a method 600 of controlling a transmission of a vehicle during a cylinder cutout mode is shown according to an example embodiment. Due to the integration of components (FIG. 1), at process 601, the controller 150 receives a shift schedule for a transmission of the vehicle (e.g., shift schedule 174). The shift schedule indicates when and to what gear/setting shift events happens. For example, at approximately 2,500 revolutions-per-minute and rising, the transmission will shift to a next higher setting (e.g., $2^{nd}$ gear to $3^{rd}$ gear). At process 602, the controller 150 receives desired operating characteristics of one or more vehicle operating parameters (e.g., operating parameters 173). Vehicle operating parameters include, but are not limited to, engine (or vehicle, in general) noise, trip time (e.g., from point A to point B), number of gear shifts, transient operation power (e.g., accelerate from 0-60 MPH, accelerate from 55-60 MPH, etc.), fluid consumption (e.g., fuel consumption, diesel exhaust fluid consumption, etc.), power output, an emissions characteristic, etc. Accordingly, a desired operating characteristic of the vehicle operating parameters includes a minimization of fuel consumption, a reduction of engine noise, a minimization of NOx emissions, and the like. At process 603, the controller 150 receives vehicle operation data (e.g., operation data 171). At process 604, the controller 150 receives route data for a route of the vehicle in advance of the vehicle traveling the route (e.g., route data 175). At process 605, the controller 150 determines the vehicle is operating in a cylinder cutout mode based on at least one of the vehicle operation data and an input. For example, the vehicle operation data may provide an engine torque and speed data point indicative of a three-cylinder cutout mode by matching or approximately matching the data point to the graph in FIG. 3. In another example, a user may affirmatively indicative (e.g., via I/O device 140) that the vehicle is in a cylinder cutout mode. All such variations are intended to fall within the spirit and scope of the present disclosure.

Responsive to the determined cylinder cutout mode, at process 606, the controller 150 determines an adjustment to the shift schedule based on the determined cylinder cutout operating mode. The adjustment may be to maintain the original shift schedule but modified to account for the change in engine torque versus speed. This type of adjustment may be used to maintain consistency in operability between cylinder cutout mode and normal operating mode for the vehicle. Or, the adjustment can be based on the changing engine torque versus speed map in addition to a specified optimization function. For example, the adjustment can be based on the different map as well as a desire to increase fuel economy during cylinder cutout mode. Accordingly, the controller 150 may adjust the shift schedule to make upshift events occur earlier (i.e., at lower engine speeds). Such shifts tend to promote achieving higher engine speeds, which tend to correspond with lower fuel consumption. In another embodiment, the adjustment may be a function of achieving peak power. Accordingly, the controller may move the upshift line to the right, such that each gear corresponds with relatively higher engine speed (and, therefore, power). The above list is not meant to be limiting as many other types of optimization functions may be utilized with method 600, and, particularly process 606.

As mentioned above and in certain embodiments, the shift adjustment determination may be based on lugback management, the vehicle operating parameter (e.g., power output), fluid consumption (e.g., fuel and/or diesel exhaust fluid), noise emissions, and location of the vehicle to adjust exhaust emissions. Lugback refers to a change in driving conditions (quick slow down when approaching a hill) that substantially affects the engine speed. For example, a vehicle may be operating at approximately 2,500 RPM and then hit an incline, which increases the load on the engine, and brings the engine speed down to approximately 1,500 RPM. This can create a strain on the engine as the transmission setting likely does not match with the engine speed. Accordingly, lugback management refers to one or more shift adjustments (process 607) that minimize the lugback on the engine.

While described primarily above as an adjustment to one or more shift points, the shift schedule adjustment may include additional functionality, such as delaying a scheduled shift event, skipping a shift event, a modification of the scheduled shift event, and/or an early implementation of the shift event. A delayed shift event refers to prolonging the shift event passed when it otherwise would occur per the shift schedule. A skip of the shift event refers to bypassing a schedule shift event completely. A modification to the shift event refers to a shift to a gear other than the schedule gear per the shift schedule (e.g., a shift to $5^{th}$ gear from $3^{rd}$ gear rather than $4^{th}$ gear). As opposed to a delay in the shift event, an early implementation of the shift event indicates a shift to the scheduled shift event ahead of when it otherwise would occur per the shift schedule. In some embodiments, the adjustment is counter the shift schedule for the transmission.

As an example, an operator may wish to minimize fuel consumption (process 602). The controller 150 determines that the vehicle is operating in a cylinder cutout mode (process 605). During a cylinder cutout, the vehicle operation data indicates a relatively smaller power output and fuel consumption (as compared to the nominal operating behavior), which indicates that the value of BSFC decreased (BTE increased) (assuming there is not a linear relationship between fuel in and power output). As such, the BSFC/BTE map has changed. To maintain a low fuel consumption, the controller 150 determines an adjustment to the shift schedule (process 606) and provides a command to implement that adjustment with the transmission (process 607). Without this adjustment, the transmission will experience gear/setting hunting events that decrease drivability of the vehicle. As an example, the controller 150 determines that the transmission should shift to $3^{rd}$ gear or lower during the cylinder cutout mode in order to continue to minimize fuel consumption. Shifting to any higher gear would create a larger load on the engine and increase fuel consumption. Further, via the input/output device 140, the operator has the ability to override the adjustment to the shift schedule of the controller 150 (e.g., to perform a maneuver, such as a vehicle pass).

A similar example could apply to lowering diesel exhaust fluid consumption (process 602). Because a relatively less amount of fuel is being used during the cylinder cutout event, a relatively less amount of diesel exhaust fluid is needed with the exhaust. Because the controller 150 is integrated with all the components in the vehicle, the controller 150 can determine an optimized amount of diesel exhaust fluid for the particular cylinder cutout mode. Similarly, the controller 150 can also determine one or more adjustments to the transmission shift schedule to implement with the transmission (processes 606-607) during the cylinder cutout operating mode. For example, the controller 150 may utilize a skip downshift event that keeps the power output constant in order to maintain a specific level of diesel exhaust fluid consumption.

Thus, in one embodiment, the controller 150 determines an optimum shift schedule based on the desired operating characteristic of one or more vehicle operating parameters during a cylinder cutout mode. In another embodiment, the controller 150 determines an optimum shift schedule for the transmission based on just the cylinder cutout mode. For example, as mentioned above, during the cylinder cutout mode, the BSFC/BTE maps may change relative to the normal operating map. Due to this change, the normal shift schedule does not align with the current operating mode of the vehicle (e.g., shift events occur to early/late and drivability is lost, avoid lugback, etc.). As such, the controller 150 adjusts the shift schedule during the cylinder cutout mode.

In still other embodiments, the controller 150 uses route data, vehicle-to-vehicle or vehicle-to-"x" data, or in combination with the vehicle operation data and a desired operating characteristic of one or more vehicle operating parameters, to optimize the transmission shift schedule for the transmission. With the route data, the controller 150 can optimize the cylinder cutout mode (e.g., three cylinders are sufficient for a flat grade of travel whereas all six cylinders should be activated when going up high grades of travel). After the route data is acquired from the designation of the route (process 604), the controller 150 determines how the cylinder cutout mode will be operated (see example above). As varying cylinder cutout modes affect the BSFC/BTE, among other factors (drivability), the controller 150 determines transmission shift schedule adjustments to align with the changing cylinder out operating mode for the route (or route segment) and supplies these commands to the transmission (process 607).

As mentioned above, the controller 150 may base the adjustment determination on a variety of factors including, but not limited to lugback management, the vehicle operating parameter (e.g., power output), fluid consumption (e.g., fuel and/or diesel exhaust fluid), noise emissions, and location of the vehicle to adjust exhaust emissions. As such, the adjustment determination may utilize one or more look-up tables, formulas, algorithms, and the like. The adjustment determination is substantially possible due to the integration of the components with the controller 150. Although described in regard to an adjustment to the transmission shift schedule, other control adjustments are also possible.

Accordingly, referring now to FIG. 7, a method 700 of optimizing components and controls of components of a powertrain system during a cylinder cutout operating mode is shown according to an example embodiment. Method 700 begins by the controller 150 providing a command to deactivate a cylinder in an internal combustion engine of a vehicle (e.g., a cylinder cutout mode) (process 701). In an alternate embodiment, the controller 150 receives vehicle operation data (process 702) indicating that the vehicle is operating in a cylinder cutout mode. Like method 600, at process 702, the controller 150 receives vehicles operation data regarding the cylinder cutout. For example, prior to deactivation the engine noise level was at "X" and now during the deactivation event the engine noise level is "X minus Y" (decrease). The vehicle operation data includes, but is not limited, the data mentioned above.

Based on the vehicle operation data, the controller 150 determines an adjustment to a control of a component of the powertrain system and/or an adjustment to one or more components of the powertrain system (processes 703-704). In one example embodiment, the adjustment determination is based on a noise, vibration, and harshness level experienced on the powertrain system during a cylinder cutout mode. For example, during a cylinder cutout event, the engine vibrates more than its nominal behavior due to combustion events not occurring in each cylinder that would otherwise balance the vibration of the engine from the combustion events. Based on this data, the controller 150 may determine that additional weight is needed on the right and left sides of the engine. This adjustment may be implemented with the vehicle where the data was derived and/or with future vehicles. Accordingly, the powertrain system is structurally optimized for the cylinder cutout operating mode. Other component adjustment determinations may include, but are not limited to, the addition of dampers, specific transmission configurations (e.g., gear ratios), exhaust system piping changes, etc.

Additionally, like the adjustment to the transmission shift schedule, the controller 150 also determines an adjustment to a control for one or more components of the powertrain system. For example, the controller 150 may provide an adjustment to the control of the torque converter (automatic transmission) to account for cylinder deactivation events. In regard to the torque converter, the controls (or adjustment) may include the timing and quantity of fluid used with the torque converter based on the specific cylinder cutout mode. These controls may utilize one or more look-up tables, formulas, algorithms, and the like. The controls may also be based on the optimization of one or more vehicle operating parameters and be further based on extending the range of cylinder deactivation, lugback management, and the like. As such, the powertrain system may be optimized both structurally and from a controls standpoint.

It should be noted that the processes of the methods described herein may be utilized with the other methods, although described in regard to a particular method. It should further be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., coupled to the components and/or systems in FIG. 1) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
a vehicle operation module structured to receive operation data regarding operation of a vehicle;
an operating state module structured to determine that the vehicle is operating in a non-nominal state responsive to the operation data; and
a transmission module structured to adjust a shift schedule of a transmission of the vehicle responsive to the determined non-nominal operating state of the vehicle, wherein the adjustment of the shift schedule includes at least one of an adjustment of an upshift and a downshift operating point for at least one transmission setting of the transmission, and wherein the transmission module is further structured to control the transmission based on the adjusted shift schedule.

2. The apparatus of claim 1, further comprising a route module structured to receive route data indicative of an upcoming terrain for a designated route of the vehicle, wherein the operating state module is structured to determine an upcoming non-nominal operating state for the vehicle during a segment of the designated route, and wherein the transmission module is structured to adjust the shift schedule of the transmission in advance of the vehicle reaching the segment of the designated route.

3. The apparatus of claim 1, further comprising a network communications module structured to receive dynamic data from at least one of another vehicle and an external network, wherein the operating state module is structured to determine an expected non-nominal operating state for the vehicle based on the dynamic data, and wherein the transmission module is structured to adjust the shift schedule for the transmission based on the determined expected non-nominal operating state for the vehicle.

4. The apparatus of claim 1, further comprising an operator interface module, wherein the operator interface module is structured to receive an input that indicates that the vehicle is currently in the non-nominal state.

5. The apparatus of claim 4, wherein the input further includes a desired operating parameter for the vehicle, wherein the transmission module is structured to adjust the shift schedule in response to the desired operating parameter.

6. The apparatus of claim 1, wherein the non-nominal state includes at least one of a cylinder cutout operating mode, a diagnostic session, a prognostic session, and a derate operating condition.

7. A system, comprising:
a powertrain system including a transmission; and
a controller coupled to the powertrain system, the controller structured to:
receive operation data regarding operation of the powertrain system;
determine the powertrain system is operating in a non-nominal state responsive to the operation data, wherein the non-nominal state includes at least one of a diagnostic session, a prognostic session, an altitude condition, a derate operating condition, a presence of an emissions characteristic, and an indication of operation in a cylinder cutout mode;
adjust a shift schedule for the transmission based on the determined non-nominal state; and
control the transmission based on the adjusted shift schedule.

8. The system of claim 7, wherein the operation data includes at least one of an engine speed and an engine torque, wherein the controller is structured to determine that an engine of the powertrain system is operating in a cylinder cutout mode responsive to the engine speed and the engine torque.

9. The system of claim 8, wherein the controller is structured to receive an operating parameter, wherein the controller is structured to adjust the shift schedule of the transmission based on the determined cylinder cutout mode and as a function of the operating parameter.

10. The system of claim 9, wherein the operating parameter includes at least one of a fluid consumption rate and a power output for an engine of the powertrain system.

11. The system of claim 10, wherein the controller lowers a nominal engine speed upshift operating point for at least one transmission setting in the shift schedule responsive to receiving an indication to reduce the fuel consumption rate for a vehicle.

12. The system of claim 7, wherein the adjustment is based on at least one of a lugback management feature, a vehicle operating parameter, a noise emissions level, and an exhaust emissions characteristic.

13. The system of claim 7, wherein the controller is structured to receive an input, wherein the input is configured to define an operating condition corresponding to an associated non-nominal state of operation for the powertrain system.

14. A method, comprising:
interpreting, by a controller, at least one of vehicle operation data regarding operation of a vehicle, route data regarding an upcoming terrain condition for a route of the vehicle, and dynamic data from at least one of another vehicle and an external network regarding an upcoming operating condition for the vehicle;
determining, by the controller, that the vehicle is at least one of in a non-nominal operating state and about to be in the non-nominal operating state;
adjusting, by the controller, a shift schedule for a transmission of the vehicle responsive to the determination that the vehicle is in or about to be in the non-nominal operating state; and
controlling, by the controller, the transmission based on the adjusted shift schedule.

15. The method of claim 14, wherein the non-nominal state includes at least one of a diagnostic session, a prognostic session, an altitude condition, a cold condition, and a derate operating condition.

16. The method of claim 14, wherein the adjustment to the shift schedule includes at least one of an adjustment to a nominal state upshift and downshift operating point for at least one transmission setting of the transmission.

17. The method of claim 14, further comprising determining, by the controller, that the vehicle is operating in a cylinder cutout mode based on the operation data indicating an engine torque and an engine speed corresponding with an operation condition for an engine of the vehicle during the cylinder cutout mode.

18. The method of claim 16, further comprising receiving, by the controller, an operating parameter for the vehicle, wherein the controller is structured to adjust the shift schedule of the transmission in response to the operating parameter.

* * * * *